United States Patent [19]

Zenker et al.

[11] Patent Number: 4,580,459
[45] Date of Patent: Apr. 8, 1986

[54] CHANGE-SPEED GEAR IN GROUP-TYPE CONSTRUCTION

[75] Inventors: Walter Zenker, Bergisch Gladbach; Karl-Heinz Hüsebusch, Cologne, both of Fed. Rep. of Germany

[73] Assignee: Klöckner-Humboldt-Deutz Aktiengesellschaft, Cologne, Fed. Rep. of Germany

[21] Appl. No.: 539,327

[22] Filed: Oct. 5, 1983

[30] Foreign Application Priority Data

Oct. 6, 1982 [DE] Fed. Rep. of Germany ....... 3236956

[51] Int. Cl.⁴ .............................................. G05G 1/10
[52] U.S. Cl. ...................................... 74/359; 74/357; 74/360
[58] Field of Search ................ 74/359, 360, 331, 745, 74/740, 357, 358, 15.6, 15.63

[56] References Cited

U.S. PATENT DOCUMENTS

| | | | |
|---|---|---|---|
| 3,744,345 | 7/1973 | Keienburg et al. | 74/745 |
| 3,916,711 | 11/1975 | Hoyer | 74/360 |
| 4,023,418 | 5/1977 | Zenker | 74/331 X |
| 4,106,364 | 8/1978 | Zenker et al. | 74/331 X |
| 4,116,090 | 9/1978 | Zenker | 74/745 |
| 4,461,188 | 7/1984 | Fisher | 74/331 X |

FOREIGN PATENT DOCUMENTS

| | | | |
|---|---|---|---|
| 2035867 | 1/1972 | Fed. Rep. of Germany | 74/331 |
| 2220729 | 11/1973 | Fed. Rep. of Germany | 74/331 |
| 2513512 | 10/1976 | Fed. Rep. of Germany | 74/360 |
| 2305647 | 10/1976 | France | 74/740 |

Primary Examiner—William F. Pate, III
Assistant Examiner—Joseph M. Rolnicki
Attorney, Agent, or Firm—Becker & Becker, Inc.

[57] ABSTRACT

A change-speed gear in group-type construction with a main gear-shifting mechanism and a group gearing connected thereto. A primary shaft drives a main shaft selectively via gears of an intermediate shaft or by direct coupling of the primary shaft and the main shaft and at different speeds. The gears of the main shaft furthermore mesh with gears of the group stages of the group gearing; these latter gears are freely rotatably mounted on an output shaft and can be coupled therewith. To eliminate components and to provide a compact change-speed gear, one gear of the intermediate shaft, in addition to its function as shifting gear of the main gear-shifting mechanism, at the same times performs the function of a reversing gear for the reverse group of the group gearing.

5 Claims, 1 Drawing Figure

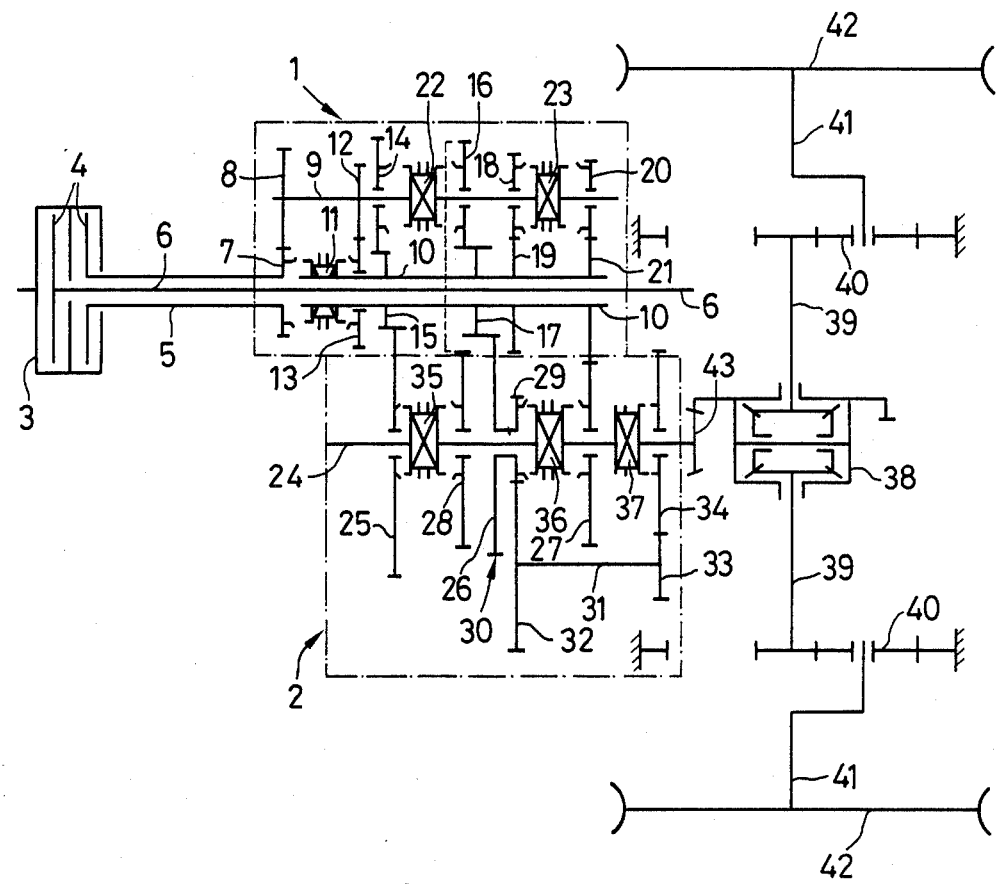

CHANGE-SPEED GEAR IN GROUP-TYPE CONSTRUCTION

BACKGROUND OF THE INVENTION

1. Field of the Invention

The present invention relates to a change-speed gear or transmission in group-type construction, especially for tractors, and comprises a main gear-shifting mechanism and an auxiliary or group gearing which is connected thereto. Gears are disposed on a main shaft and can be driven at a plurality of different speeds from a primary shaft, either via gears of an intermediate shaft, or by means of direct coupling of the primary and main shafts. For forward stages of the group gearing, the gears of the main shaft mesh with gears which are freely rotatably mounted on an output shaft and can be coupled therewith. For a reverse stage of the group gearing, a gear is provided which is freely rotatably mounted on the output shaft and can be coupled therewith.

2. Description of the Prior Art

With one known change-speed gear of the aforementioned general type (German Offenlegungsschrift No. 24 04 844), a reversing gear having two gears is disposed between a rigid gear of the main shaft and the gear which is rotatably mounted on the output shaft and serves for the reverse stage of the group gearing. Furthermore, gear shift sleeves for connecting altogether five gear or speed changes of the main gear-shifting mechanism are disposed together with the corresponding rotatably mounted gears partially on the main shaft and partially on the intermediate shaft. To drive a creep speed gear of this change-speed gear, a gear is provided which is rigidly connected with the main shaft; otherwise, this last gear has no function. All of these features of the heretofore known change-speed gear lead to an overall very complex and expensive construction, as well as to undesired large dimensions of the transmission. Arranging the gear shift sleeves partially on the intermediate shaft and partially on the main shaft is a drawback for the arrangement of the required gear-shifting mechanisms and during the assembly or disassembly of the intermediate shaft and the main shaft during manufacture or repair of the transmission.

It is an object of the present invention to eliminate these drawbacks and thereby to provide a change-speed gear in group-type construction which is as compact as possible and which can be manufactured from a small number of components, yet allows a large number of different gear ratio stages to be connected with as uniform a gradation as possible.

BRIEF DESCRIPTION OF THE DRAWING

This object, and other objects and advantages of the present invention, will appear more clearly from the following specification in conjunction with the accompanying drawing, which schematically illustrates one specific embodiment of the present invention.

SUMMARY OF THE INVENTION

The change-speed gear of the present invention is characterized primarily in that a gear, which is freely rotatably mounted on the intermediate shaft and which can be coupled therewith, meshes with a gear which is rigidly disposed on the main shaft, and at the same time meshes as a reversing gear with the gear of the reverse stage of the group gearing.

As a result of the dual utilization of a gear, which is freely rotatably mounted on the intermediate shaft, as a speed gear of the main gear-shifting mechanism and as a reversing gear for driving the reverse group, an additional reversing intermediate gear or an additional reversing gear can be eliminated. In the gear or speed stage associated with it, this gear drives the gear for the reverse stage directly from the intermediate shaft, while in the other gear or speed stages, the reverse group is operated via this reversing gear from the gear which is rigidly disposed on the main shaft. In addition to eliminating a special reversing gear or a reversing intermediate gear, the present invention advantageous allows the dimensions of the change-speed gear to be kept very small, since the intermediate shaft and the output shaft can be placed very close to one another.

Pursuant to one specific embodiment of the present invention, it is proposed that the gear, which is freely rotatably mounted on the intermediate shaft and can be coupled therewith, be provided as a reversing gear for the fifth gear or speed stage of the main gear-shifting mechanism. In this way, for a main gear-shifting mechanism having five or six gear or speed stages, there is provided a favorable gradation in the speed or gear ratio of the speed or gear stage connected in the reverse group. The use of the gear of the fifth gear or speed stage also permits a favorable geometric positioning of the three shafts.

According to the present invention, there is furthermore of considerable advantage if all of the gears which are arranged on the main shaft mesh with gears of the intermediate shaft, and if all of the gears of the main shaft which mesh with gears of the output shaft are rigidly arranged on the main shaft, while the gears of the intermediate shaft which are connected with these gears are rotatably mounted on the intermediate shaft and can be coupled therewith by means of double gear shift sleeves. The first feature offers the possibility of being able to optimally use all of the gears of the main shaft and to avoid an unnecessary expense for gears.

The second feature is designed for preferably disposing all of the gear shift sleeves on the intermediate shaft and respectively relying upon them for connecting two speed or gear stages. From this there is obtained the possibility of arranging in a simple manner the shifting mechanism for the main gear-shifting as well as for the group gearing. It is also advantageous for the manufacture of the change-speed gear and the later assembly and disassembly thereof if on one shaft primarily rotatably mounted gears are disposed, and on the other shaft primarily rigid gears are disposed. A further advantage results from the small masses which have to be synchronized during connection of the gear or speed changes.

Pursuant to a further specific embodiment of the present invention, there is proposed that between the gears of the intermediate shaft and the output shaft, which are respectively in the power flow via gears of the main shaft, a lateral displacement of at least one half of the width of the gear be provided if the sum of the crown circle radii of the pertaining gears is greater than or equal to the sum of the crown circle radii of the gear of the reverse stage and the gear provided as the reversing gear. This assures that even with a small spacing of the shafts from one another and the compact construction of the change-speed gear resulting therefrom, with the exception of the gear of the intermediate shaft provided as the reversing gear, no other gears mesh with gears of the output shaft.

Further advantageous developments and features of the present invention are intended for simplification of the drive of the creep speed gear. In particular, parallel to the output shaft there may be disposed a creep speed gear, the input gear of which may mesh with a gear which has a smaller pitch circle diameter and is part of a double gear which is mounted on the output shaft. A second gear of a double gear having a larger pitch circle diameter may be directly drivable from a gear of the intermediate shaft via a fixed gear of the main shaft. That gear of the double gear which has a greater pitch circle diameter may be drivable from that gear of the intermediate shaft which serves as the reversing gear via the gear of the main shaft.

DESCRIPTION OF PREFERRED EMBODIMENTS

Referring now to the drawing in detail, schematically illustrated is a change-speed gear in group-type construction. This gear comprises a main gear-shifting mechanism 1 and a group gearing 2 connected thereto. A flywheel 3 of a non-illustrated internal combustion engine, via a double clutch 4, drives a primary shaft 5, which is embodied as a hollow shaft, and an auxiliary drive shaft 6, which is coaxially disposed in the hollow shaft 5 and is provided, for example, as the power take-off shaft of a tractor. A gear 7 is rigidly disposed on the primary shaft 5 and meshes with a gear 8 of an intermediate shaft 9; in this way, the gear 7 constantly drives the intermediate shaft 9. Coaxial with respect to the primary shaft 5, and in line therewith, there is a main shaft 10 which is also embodied as a hollow shaft and which can be coupled directly with the primary shaft 5 by means of a double gear shift sleeve 11. Following the gear 8 on the intermediate shaft 9 there is disposed a further gear 12 which is rigidly connected with the shaft 9 and meshes with a gear 13 which is rotatably mounted on the main shaft 10. By means of the already mentioned double gear shift sleeve 11, in addition to the described connection between the primary shaft 5 and the main shaft 10, the gear 13 can be coupled with the main shaft 10 in a second position. Further pairs of gears 14∝15, 16–17, 18–19, and 20–21 which mesh with one another are disposed in the main gear-shifting mechanism 1 on the intermediate shaft 9 and the main shaft 10. With each of these pairs of gears, the gears 14, 16, 18, and 20 respectively, are freely rotatably mounted on the intermediate shaft 9, while the respective gears 15, 17, 19, and 21 is rigidly connected with the main shaft 10. The gears 14 and 16 can be alternately connected with the intermediate shaft 9 by means of a double gear shift sleeve 22, and the gears 18 and 20 alternately can be connected with the intermediate shaft 9 by means of a double gear shift sleeve 23.

Furthermore, the gears which are rigidly disposed on the main shaft 10 respectively mesh with gears which are freely rotatably disposed on an output shaft 24, thereby forming pairs of gears 15–25, 17–26, and 21–27. A gear 28 is freely rotatably mounted on the output shaft 24 next to the gear 25; this gear 28 meshes directly with the gear 16 of the intermediate shaft 9. The gear 26 disposed on the output shaft 24 is combined with a gear 29 to form a double gear 30. The gear 29 thereof, which has the smaller pitch diameter, drives a creep speed gear 31 via an input gear 32. An output gear 33 of the gear 31 meshes in turn with a gear 34 which is freely rotatably mounted on the output shaft 24.

The rotatable, side-by-side gears 25 and 28 on the output shaft 24 are coupled with the latter by means of an alternately acting double gear shift sleeve 35; the double gear 30 and the gear 27 are coupled with the output shaft 24 by means of a double gear shift sleeve 36; and the gear 34 is coupled with the shaft 24 by means of a gear shift sleeve 37. A differential gearing 38 can be driven by the output shaft 24 via a bevel gear 43. Drive axles 41 and driving wheels 42 are respectively driven by the differential gearing 38 via an intermediate gear 39 and a final drive 40 which is embodied as a planetary gear.

In the main gear-shifting mechanism 1, the gears 20 and 21 form the gear or speed stage I by coupling the gear 20 onto the intermediate shaft 9 by means of the double gear shift sleeve 23. If this sleeve 23 is shifted toward the left, the gear 18 is coupled onto the intermediate shaft 9, and together with the gear 19 on the main shaft 10 forms the gear or speed stage II. The gear or speed stage III is connected by coupling the gear 13 on the main shaft 10 by means of the double gear shift sleeve 11, so that a power flow from the intermediate shaft 9 to the main shaft 10 is effected via the gears 12 and 13. When this double gear shift sleeve 11 is shifted into a left end position thereof, the primary shaft 5 is connected thereby directly with the main shaft 10; at this point, the gear or speed stage IV of the main gear-shifting mechanism 1 is engaged. The gear or speed stages V and VI are connected via the double gear shift sleeve 22. In the right shifting position of this sleeve 22, the gear 16 is rigidly connected with the intermediate shaft 9 and drives the gear 17, which is rigidly mounted on the main shaft 10, for forming the gear or speed stage V. In the left position of the sleeve 22, the intermediate shaft 9 and the gear 14 are connected with one another, so that the main shaft 10 is driven via the gear 15 in the gear or speed stage VI.

In the group transmission, each of the gear or speed stages is associated with a specific group stage. In particular, there is a crawling or creep speed group (C), a slow group (L), a middle group (M), and a high-speed group (H). Furthermore, a reverse group (R) may be connected therewith.

If the gear shift sleeve 37 is in the correct or right position thereof, the gear 34 is rigidly connected to the output shaft 24, and a power flow is effected from the main shaft 10 to the output shaft 24 via the gear 17, the double gear 30, the creep speed gear 31, and the gear 34 at the gear ratio of the crawling speed group (C).

In the slow group (L) of the group transmission or gearing 2, the double gear shift sleeve 35 is in its left position and connects the gear 25 with the output shaft 24, so that a power flow is effected from the main shaft 10 to the output shaft 24 via the gear 15 and the gear 25.

In the group stage (M), the double gear shift sleeve 36 is shifted to the left and connects the double gear 30 with the output shaft 24, so that, from the main shaft 10, the output shaft 24 with the gearing of the M-group stage is shifted into rotation via the gear 17 and the double gear 30.

If this double gear shaft sleeve 36 is shifted into a right end position thereof, the gear 27 is coupled thereby onto the output shaft 24, and the main shaft 10 drives the output shaft 24, at the highest gear or speed stage (H), via the pair of gears 21–27.

The reverse group (R) of the group gearing 2 is connected with the aid of the double gear shift sleeve 35, which connects the gear 28 with the output shaft 24. Since this gear 28 meshes with the gear 16 for the gear or speed stage V of the main gear-shifting mechanism 1, which gear 16 is freely rotatable disposed on the intermediate shaft 9, the output shaft 24, in the stages I, II, III, IV, and VI, is respectively driven from the main shaft 10 via the gears 17, 16, and 28 with reversal of rotation. In the gear or speed stage V, the gear 16, which is connected with the intermediate shaft 9, drives the gear coupled on the output shaft 24.

As shown in the drawing, in the presently illustrated embodiment, with the use of a small number of gears, a total of 24 different vehicle speeds can be connected to the forward direction, and in addition six traveling speeds can be connected for the reverse direction. Furthermore, the inventive change-speed gear or transmission can have a compact construction, since the special use of an additional reversing gear is not necessary. As can be seen in the drawing, the gears 14, 15, and 25 are disposed relative to one another in such a way that this compact construction and advantageous utilization of the gear 16 as a reversing gear are possible with a favorable gearing gradation.

The present invention is, of course, in no way restricted to the specific disclosure of the specification and drawing, but also encompasses any modifications within the scope of the appended claims.

What we claim is:

1. In a change-speed gear in group-type construction, especially for tractors, and including a main gear-shifting mechanism and a group gearing connected thereto; gears are disposed on a main shaft and can be driven at a number of different speeds from a primary shaft, either via gears of an intermediate shaft, or by direct coupling of the primary shaft and the main shaft; for the forward stages of the group gearing, the gears of the main shaft in turn mesh with gears which are freely rotatably mounted on an output shaft and can be coupled therewith; for a reverse group of the group gearing, a gear of the main shaft drivingly connects with a gear of said reverse group which is freely rotatably mounted on the output shaft and can be coupled therewith; the improvement in combination therewith which comprises:

a first gear, which is freely rotatably mounted on said intermediate shaft and can be coupled therewith;
   a second gear, which is rigidly disposed on said main shaft, with said first gear meshing with said second gear and, at the same time, as a reversing gear meshing with said gear of said reverse group of said group gearing, which reverse group gear is freely rotatably mounted on said output shaft and can be coupled therewith;
   all gears disposed on said main shaft meshing with said gears of said intermediate shaft; and
   a creep speed gear which is disposed parallel to said output shaft and includes an input gear which meshes with a third gear, which has a smaller pitch circle diameter and is part of a double gear mounted on said output shaft; said double gear including a fourth gear which has a greater pitch circle diameter than the third gear; said fourth gear, of said double gear, also being capable of being driven from said first gear of said intermediate shaft via said second gear of said main shaft, said second gear having a triple utilization including (a) transfer of drive torque from said first gear via said second gear onto said main shaft; (b) transfer of the drive torque from said main shaft via said double gear driving said creep speed gear; and (c) transfer of the drive torque from said main shaft via said second gear onto said first gear effective upon said reverse group which is freely rotatably mounted on said output shaft.

2. A change-speed gear in combination according to claim 1, in which said first gear is provided additionally for employment as a reversing gear for a fifth speed stage of said main gear-shifting mechanism.

3. A change-speed gear in combination according to claim 1, in which those gears of said main shaft which mesh with gears of said output shaft are rigidly disposed on said main shaft, while those gears of said intermediate shaft which are associated with these gears of said main shaft are rotatably mounted on said intermediate shaft and can be coupled therewith; and which includes double gearshift sleeves for effecting said last mentioned coupling thereby eliminating a special reversing gear and eliminating a reversing intermediate gear, and also allowing that the change-speed gear be kept very small and, while providing a total of twenty-four different vehicle speeds for forward direction, and in addition six traveling speeds can be connected for reverse direction.

4. A change-speed gear in combination according to claim 1, which includes a lateral displacement, of at least one half the width of a gear, between said gears of said intermediate shaft and said gears of said output shaft, which groups of gears are respectively in power flow via a gear of said main shaft, when the sum of the crown circle radii of said aforementioned gears of said intermediate shaft and of said output shaft is at least as great as the sum of the crown circle radii of said gear of said reverse group and of said first gear so that via the lateral displacement of the gears there is to be avoided a simultaneous meshing between the gears of the intermediate shaft, main shaft and output shaft.

5. A change-speed gear according to claim 1, in which said fourth gear, of said double gear, can be driven from said first gear of said intermediate shaft via said second gear of said main shaft, said second gear having a triple utilization including (a) transfer of drive torque from said first gear via said second gear onto said main shaft; (b) transfer of the drive torque from said main shaft via said second gear driving said creep speed gear; and (c) transfer of the drive torque from said main shaft via said second gear onto said first gear effective upon said reversing gear and further via the gear which is freely rotatably mounted on said output shaft accompanied by cost reduction and compact manner of construction.

* * * * *

UNITED STATES PATENT AND TRADEMARK OFFICE
CERTIFICATE OF CORRECTION

PATENT NO. : 4,580,459

DATED : April 8, 1986

INVENTOR(S) : Walter Zenker et al

It is certified that error appears in the above-identified patent and that said Letters Patent is hereby corrected as shown below:

On the title page inventors should read:

-- [75] Inventors: Walter Zenker, Bergisch Gladbach;
Karl-Heinz Hülsebusch, Cologne,
both of Fed. Rep. of Germany --.

Signed and Sealed this

Twenty-second Day of July 1986

[SEAL]

Attest:

DONALD J. QUIGG

Attesting Officer

Commissioner of Patents and Trademarks